US008663358B2

(12) United States Patent  
Choi et al.

(10) Patent No.: US 8,663,358 B2
(45) Date of Patent: Mar. 4, 2014

(54) FILTER MEDIA WITH IMPROVED CONDUCTIVITY

(75) Inventors: Wai M. Choi, West Newton, MA (US); Karin N. Soper, Rindge, NH (US)

(73) Assignee: Hollingsworth & Vose Company, East Walpole, MA (US)

( * ) Notice: Subject to any disclaimer, the term of this patent is extended or adjusted under 35 U.S.C. 154(b) by 0 days.

(21) Appl. No.: 13/103,170

(22) Filed: May 9, 2011

(65) Prior Publication Data

US 2011/0265312 A1    Nov. 3, 2011

Related U.S. Application Data

(63) Continuation of application No. 11/461,804, filed on Aug. 2, 2006, now Pat. No. 7,964,012.

(60) Provisional application No. 60/705,135, filed on Aug. 3, 2005.

(51) Int. Cl.
*B01D 39/14* (2006.01)

(52) U.S. Cl.
USPC .......... 55/524; 55/360; 55/522; 55/527; 55/528; 95/59; 95/61; 96/69; 210/243; 210/501; 210/502.1; 210/503; 210/508

(58) Field of Classification Search
USPC ............ 55/360, 522–524, 527; 210/243, 501, 210/502.1, 503–506, 508; 96/69; 95/59, 61
See application file for complete search history.

(56) References Cited

U.S. PATENT DOCUMENTS

| | | | |
|---|---|---|---|
| 4,383,925 A | 5/1983 | Hilscher et al. |
| 4,531,957 A | 7/1985 | Malik |
| 4,803,096 A | 2/1989 | Kuhn et al. |
| 4,988,571 A | 1/1991 | Ueda |
| 5,213,882 A | 5/1993 | Sassa et al. |
| 5,483,324 A | 1/1996 | Otsuka |
| 5,527,569 A | 6/1996 | Hobson et al. |
| 5,580,459 A | 12/1996 | Powers et al. |
| 5,672,399 A | 9/1997 | Kahlbaugh et al. |
| 5,785,725 A | 7/1998 | Cusick et al. |
| 6,099,726 A | 8/2000 | Gembolis et al. |
| 6,171,684 B1 | 1/2001 | Kahlbaugh et al. |
| 6,433,359 B1 | 8/2002 | Kelley et al. |
| 6,464,870 B1 | 10/2002 | Castellanos et al. |
| 6,858,057 B2 | 2/2005 | Healey |
| 7,008,465 B2 | 3/2006 | Graham et al. |
| 7,137,510 B1 | 11/2006 | Klein et al. |
| 7,314,497 B2 | 1/2008 | Kahlbaugh et al. |
| 7,964,012 B2 | 6/2011 | Choi et al. |
| 2001/0053647 A1 | 12/2001 | Bugnet et al. |
| 2003/0132156 A1 | 7/2003 | Rickle |
| 2004/0026309 A1 | 2/2004 | Jarvinen et al. |
| 2004/0211163 A1 | 10/2004 | Faulkner et al. |
| 2005/0026526 A1 | 2/2005 | Verdegan et al. |
| 2007/0007218 A1 | 1/2007 | Hundley et al. |
| 2008/0120464 A1 | 5/2008 | Shin |
| 2009/0022975 A1 | 1/2009 | Hales et al. |
| 2009/0078637 A1 | 3/2009 | Shane |
| 2009/0249951 A1 | 10/2009 | Graber et al. |
| 2010/0314333 A1 | 12/2010 | Witsch et al. |

FOREIGN PATENT DOCUMENTS

| | | |
|---|---|---|
| CA | 2 202 657 C | 1/2001 |
| DE | 2 244 414 A1 | 3/1973 |
| JP | 60-064612 A | 4/1985 |
| JP | 2000-140532 A | 5/2000 |
| NL | 8 700 124 A | 8/1988 |
| WO | WO 01/37970 A1 | 5/2001 |
| WO | WO 02/074416 A1 | 9/2002 |
| WO | WO 2009/089891 A2 | 7/2009 |
| WO | WO 2010/054218 A1 | 5/2010 |

OTHER PUBLICATIONS

Examination Report for Japanese Application No. 2008-525220 issued Nov. 12, 2010.
International Search Report for Application No. PCT/US2006/030406 mailed Feb. 15, 2007.
International Preliminary Report on Patentability for Application No. PCT/US2006/030406 mailed Feb. 14, 2008.
Japanese Office Action for Japanese Application No. 2008-525220 issued Aug. 29, 2011.

*Primary Examiner* — Christopher P Jones

(74) *Attorney, Agent, or Firm* — Wolf, Greenfield & Sacks, P.C.

(57) ABSTRACT

Filter media are provided having improved conductivity to enhance filtration efficiency and/or dissipate static charge, and methods for making the same. In one exemplary embodiment, the filter media can include a filtration substrate, and at least one conductive coating disposed on at least a portion of the filtration substrate. In use, the conductive coating is coupled to an energy source and it is effective to emit ions when energy is delivered thereto to increase the efficiency of the filtration substrate and/or to dissipate or eliminate static charge generated during filtration.

23 Claims, No Drawings

FILTER MEDIA WITH IMPROVED CONDUCTIVITY

CROSS REFERENCE TO RELATED APPLICATIONS

The present application is a continuation of U.S. application Ser. No. 11/461,804 (now U.S. Pat. No. 7,964,012), filed on Aug. 2, 2006 and entitled "Filter Media With Improved Conductivity", which claims priority to U.S. Provisional Application No. 60/705,135 filed on Aug. 3, 2005 and entitled "Filter Media With Improved Conductivity," which is hereby incorporated by reference in their entirety.

FIELD OF THE INVENTION

The present invention relates to filter media having an improved conductivity and to methods for making the same.

BACKGROUND OF THE INVENTION

It is well known that charged particles are more readily captured by a filter media than are neutral particles. One of the most common ionizing air filters is a precipitator type air filter, which is an electronic air filter having ionizing wires of about 0.005 inches diameter, charged at about 7 Kilovolts, placed between grounded plates to generate a corona and charge the dust particles passing therethrough. Further down the airflow path, alternating charged and grounded plates collect the charged particles of dust. The disadvantage of precipitator type filters is that they are difficult to maintain, requiring regular cleaning of the collector plates, which get loaded with fine dust. Cleaning often requires using very strong detergents. Another disadvantage of the precipitator type filter is that they produce a significant amount of ozone. This occurs because the charging wires are placed near grounded surfaces. This arrangement generates corona all along the length of the wires, which can be seen glowing in the dark. Moreover, in some liquid filtration applications, such as filtrating of hydraulic fluid, a static charge can build up on the surface of the filter, potentially causing an explosion or fire hazard.

Accordingly, there remains a need for filter media having improved conductivity to enhance filtration efficiency and/or static electricity dissipation, and to methods for making the same.

SUMMARY OF THE INVENTION

The present invention generally provides filter media having an improved conductivity to enhance filtration efficiency and/or static electricity dissipation, and to methods for making the same. In one exemplary embodiment, a filter media is provided having a filtration substrate, and at least one conductive coating disposed on at least a portion of the at least one filtration substrate. The filtration substrate can be formed from a variety of materials, and it can include any number of filtration layers that together form a substrate. By way of non-limiting example, the filtration substrate can be formed from natural fibers, organic fibers, inorganic fibers, or combinations thereof. Suitable fibers include, for example, glass fibers, ceramic fibers, polymer fibers, cotton fibers, hemp fibers, carbon fibers, and combinations thereof. The conductive coating can also be formed from a variety of materials, and it can be disposed on all or only a portion of the filtration substrate. By way of non-limiting example, the conductive coating can be formed from carbon fibers, carbon particles, metal fibers, conductive polymers such as poly(3,4ethylenedioxythiophene)poly(styrenesulfonate), polyaniline, nickel coated carbon fibers, or other conductive materials. In one exemplary embodiment, the conductive coating is formed from a metal fiber that includes a metal such as, for example, aluminum, silver, copper, nickel, gold, lead, tin, zinc, steel, and combinations thereof. In another exemplary embodiment, the conductive coating can be formed from a metal, such as aluminum, silver, copper, nickel, gold, lead, tin, zinc, and combinations thereof.

The conductive coating can also be disposed on the filtration substrate using a variety of techniques. For example, in one embodiment the filtration substrate can be saturated with the conductive coating. In another embodiment, the conductive coating can be painted or extruded onto the filtration substrate. In another embodiment, the filter media can include a bonding agent that bonds the conductive coating to the filtration substrate. The bonding agent can be formed from, for example, a polymer such as polyvinylidene chloride, acrylic latex, polyurethane dispersion, polyvinyl acetate, polyvinyl alcohol, and combinations thereof. The bonding agent can also optionally be conductive.

In use, the filter media can be configured for a variety of purposes, including EMI shielding, optical shielding, or other uses that require electrically enhanced filtration and/or static dissipation. The filter media can also be pleated or have any other configuration that can vary depending on the intended use. In order to electrically charge the conductive coating, the filter media can also include a coupling mechanism for connecting a high voltage power source to the conductive coating. When energy is delivered to the conductive coating, the coating will emit ions to increase the efficiency of the filter media.

The present invention also provides exemplary methods for forming a filter media. In one embodiment, the method can include forming a filtration substrate having at least one filtration layer, and disposing at least one conductive coating on at least one surface of the filtration substrate to form a conductive filter media. In one embodiment, the conductive coating can be, for example, a conductive polymer, and the conductive coating can be disposed on at least one surface of the filtration substrate by saturating the filtration substrate with the conductive polymer. In another embodiment, the conductive coating can be bonded to at least one surface of the filtration substrate. A polymer coating, for example, can be used to bond the conductive coating to the filtration substrate. The method can also include placing the conductive filter media in an air stream, and coupling a high voltage power supply to the conductive filter media to create an electric field such that the conductive coating will emit ions that charge dust particles in the air stream to increase the trapping efficiency of the conductive filter media. In another embodiment, the method can include placing the conductive filter media in an fluid stream, and coupling a high voltage power supply to the conductive filter media to create an electric field such that the conductive coating will dissipate static charge generated from the flow of fluid through the conductive filter media. In other embodiments, a polymer can be deposited via an extrusion process.

DETAILED DESCRIPTION OF THE INVENTION

The present invention provides filter media having improved conductivity to enhance filtration efficiency, and methods for making the same. In one exemplary embodiment, the filter media can include a filtration substrate, and at least one conductive coating disposed on at least a portion of the filtration substrate. In use, the conductive coating is coupled to an energy source and effectively emits ions when energy is delivered thereto. This increases the efficiency of the filtration substrate, and in particular increases the trapping efficiency of the filter media. The conductive coating can also eliminate or dissipate static charge, particularly static charge generated during fluid filtration.

The filter media can be adapted for use in a variety of applications including, by way of non-limiting example, EMI shielding, optical shielding, or other uses that require electrically enhanced filtration, such as in ASHRAE filters, vacuum bag filters, vacuum exhaust filters, room air cleaner filters, engine/cabin air filters, HEPA (High Efficiency Particulate Air) filters, ULPA (Ultra Efficiency Particulate Air) filters, fuel filters, and hydraulic fluid filters. The filter media can also be formed into a variety of filter constructs including, for example, a pleated filter media. The conductive media can also have application in the area of static charge elimination or dissipation.

As indicated above, in an exemplary embodiment the filter media is formed from a filtration substrate and a conductive coating disposed on at least a portion of the filtration substrate. The filtration substrate can have virtually any configuration known in the art, and the particular configuration can vary depending on the intended use. In one embodiment, the filtration substrate can be formed from one or more filtration layers, such as a non-woven web, that are combined to form the filtration substrate. The filtration layer(s) can be formed from a variety of materials, including natural fibers, organic fibers, inorganic fibers, and combinations thereof. Suitable exemplary fibers include glass fibers, ceramic fibers, polymer fibers, cotton fibers, hemp fibers, carbon fibers, and combinations thereof. The filtration layers can also be formed using a variety of techniques known in the art, including web forming, e.g., wet laid, dry laid, and direct laid, carding, spun bonding, melt blowing, film fibrillation, etc. Once the layers are formed, if desired multiple layers can be combined using various techniques known in the art, including, by way of non-limiting example, ultrasonic welding, ultrasonic bonding, adhesives or other methods known to those having ordinary skill in the art. Ultrasonic bonding can be accomplished by edge welding, full width bonding, partial width bonding, or combinations thereof. Alternatively, the layers can be pressed together by a calendaring process which causes each layer to physically adhere to the other layer.

As previously indicated, the filter media can also include a conductive coating that is applied to at least a portion of the filtration substrate. When energy is delivered to the conductive coating, the coating is preferably configured to emit ions that charge dust particles in the air stream to increase the trapping efficiency of the conductive filter media. The conductive coating can also be used to eliminate or dissipate any static charge that may be generated, particularly during fluid filtration. In an exemplary embodiment, the conductive coating produces a filter media having a surface resistivity in the range of about $1 \times 10^2$ to $1 \times 10^{12}$ ohms$^2$, however the surface resistivity can vary depending on the intended use as well as the particular materials and processes used to form the filter media. For example, where the filter media is to be used to dissipate static charge, the surface resistivity is preferably less than about $1 \times 10^7$ ohms$^2$.

The conductive coating can be formed from a variety of materials, but as indicated above it is preferably formed from a material that is configured to emit ions when energy is delivered thereto. In one exemplary embodiment, the conductive coating can be from a conductive metal or metal fibers that include one or more metals, such as aluminum, silver, copper, nickel, gold, lead, tin, zinc, and combinations thereof. In one exemplary embodiment, the conductive coating can be formed from conductive carbon fibers, such as a nickel coated carbon fiber. One exemplary nickel coated carbon fiber is manufactured by Toho Tenax America, Inc. of Rockwood, Tenn. The conductive coating can also be formed from a conductive polymer, such as poly(3,4ethylenedioxythiophene)poly(styrenesulfonate) or polyaniline.

The conductive coating can be formed either prior to or during application of the coating on the filtration substrate, and various processes known in the art can be used to form the coating and/or apply it to the substrate. The conductive coating can also be applied to all or only portions of one or both opposed surfaces of the filtration substrate, or to all or only portions of one or both of the opposed surfaces of the filtration layers that are combined to form the filtration substrate. In one embodiment, the conductive materials can be dispersed in a solution, such as water or a polymer, and the filtration substrate can be saturated with the solution such that the coating surrounds the fibers that form the filtration substrate. For example, the substrate can be placed into a mold, and a slurry containing water or a polymer solution and the conductive fibers or metal can be drained through the substrate to saturate the substrate and thereby deposit the conductive fibers or metal onto the substrate. In other embodiments, the conductive coating can be painted onto the surface(s), e.g., using a paint brush, applied using a vacuum metalizing process, an electrode plating process, a chemical plating process (without electrodes), sputtered onto the filtration substrate or filtration layers that form the substrate, or extruded onto the substrate. For example, where an extrusion process is used, a conductive polymer, or a polymer and a conductive material such as a conductive powder or particles, can be placed into an extruder to form a hot melt. The hot melt can be extruded directly onto the substrate whereby it surrounds and bonds with the fibers that form the substrate. A person skilled in the art will appreciate that the conductive coating can be formed using various techniques and from various combinations of materials. Moreover, a variety of techniques can be used to apply the coating to all or discrete portions of the filtration substrate.

A bonding agent, such as a polymer, can also optionally be used to bond the conductive coating to the filtration substrate. The bonding agent can be added during various stages of the process. For example, where the conductive material is dispersed in water, the bonding agent can be added to the water and saturated onto the substrate with the conductive material. The bonding agent can also or alternatively be applied to the coating, particularly in the case of a fiber or particle. While a variety of bonding agents can be used, suitable exemplary bonding agents include polymers, such as polyvinylidene chloride, acrylic latex, polyurethane dispersion, polyvinyl acetate, and polyvinyl alcohol. The bonding agent can also optionally be conductive, and can be formed from various conductive materials, such as those previously disclosed herein.

In use, energy is delivered to the filter media, and in particular to the conductive coating, from a high voltage power source to impart conductivity to the filter media. The high voltage power supply can be connected to the filter media using a coupling mechanism, such as electrodes. As a result, an electric field will be created and the conductive coating will emit ions that charge dust particles in the air stream, thereby increasing the trapping efficiency of the conductive filter media. The conductive coating also offers a path for redirecting any static charge that is generated during filtration, thereby reducing or eliminating the static charge.

The following non-limiting examples serve to further illustrate various exemplary embodiments of the invention:

Example 1

A glass fiber filter media is formed from glass wool fibers having a diameter in the range of about 0.3 to 4.0 microns, and chopped glass fibers having a length of about 0.25 inches and a diameter of about 7 microns. The glass fiber filter media is then placed in a vacuum chamber which is pumped down to a pressure of about 10E-04 to 10E-05 torr. A vacuum metalizing process is used to deposit a conductive coating onto the glass fiber filter media. In particular, an aluminum wire is heated electrically within the chamber, whereby it vaporizes under vacuum and re-condenses onto a surface of the filter media to form a layer of conductive aluminum coating of approximately 300 Angstrom.

The coated glass fiber filter media is measured for surface electrical resistance using a Vermason H1003 square probe for testing surface resistivity. The measurement equipment is confirmed to EN100015 Part 1:1991. The electrical resistance of the coated glass fiber filter media measured less than 50 ohm, compared to an uncoated glass fiber filter media which has an electrical resistance in excess of 10E13 ohm.

Example 2

A glass fiber filter media is formed from 0.25 inch chopped strand glass fiber having a diameter of about 6 to 7 microns, 0.8 micron microglass fiber, 4.5 to 5.0 micron microglass fiber, and polyvinyl alcohol fiber. Nickel coated carbon fibers, purchased from Toho Tenax America, Inc. are dispersed in water, along with a polyvinyl alcohol fiber to facilitate adhesion of the fiber to the glass fiber filter media. The glass fiber filter media is saturated with the dispersion to deposit approximately 21 g/m$^2$ of nickel coated carbon fiber onto the glass fiber filter media.

The coated glass fiber filter media is measured for surface electrical resistance using a Vermason H1003 square probe for testing surface resistivity. The measurement equipment is confirmed to EN100015 Part 1:1991. The electrical resistance of the coated glass fiber filter media measured about 25.3 ohms$^2$, compared to an uncoated glass fiber filter media which has an electrical resistance in excess of $1\times10^{13}$ ohms$^2$.

Example 3

A glass fiber filter media is prepared as set forth in Example 2. The filter media is coated with carbon fibers using the process set forth in Example 2. The coated glass fiber filter media is measured for surface electrical resistance using a Vermason H1003 square probe for testing surface resistivity. The measurement equipment is confirmed to EN100015 Part 1:1991. The electrical resistance of the coated glass fiber filter media measured to be 13.5 ohms$^2$, compared to an uncoated glass fiber filter media which has an electrical resistance in excess of $1\times10^{13}$ ohms$^2$.

Example 4

A glass fiber filter media is prepared as set forth in Example 2. The filter media is coated with stainless steel fibers using the process set forth in Example 2. The coated glass fiber filter media is measured for surface electrical resistance using a Vermason H1003 square probe for testing surface resistivity. The measurement equipment is confirmed to EN100015 Part 1:1991. The electrical resistance of the coated glass fiber filter media measured to be 27.6 ohms$^2$, compared to an uncoated glass fiber filter media which has an electrical resistance in excess of $1\times10^{13}$ ohms$^2$.

Example 5

A glass fiber filter media is formed from 0.4 micron microglass fiber, 0.6 micron glass fiber, 1 micron glass fiber, 2.6 micron glass fiber, and 1.0 denier polyvinyl alcohol fiber. The fiber composition is such that it will attain a required filter efficiency. A painting process is used to deposit carbon containing ink onto the glass fiber filter media.

The coated glass fiber filter media is measured for surface electrical resistance using a Vermason H1003 square probe for testing surface resistivity. The measurement equipment is confirmed to EN100015 Part 1:1991. The electrical resistance of the coated glass fiber filter media measured in the range about 300 to 55,000 ohms$^2$, compared to an uncoated glass fiber filter media which has an electrical resistance in excess of $1\times10^{13}$ ohms$^2$.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A filter media, comprising:
   a non-woven fiber web; and
   at least one conductive coating that coats at least a portion of the non-woven fiber web, wherein the conductive coating is formed from a conductive polymer, and
   wherein the filter media is at least one of a fuel filter media or a hydraulic filter media.

2. The filter media of claim 1, wherein the filter media has a surface resistivity in the range of about $1\times10^2$ to $1\times10^{12}$ ohms$^2$.

3. The filter media of claim 1, wherein the filter media has surface resistivity of less than about $1\times10^7$ ohms$^2$.

4. The filter media of claim 1, wherein the filter media is formed from multiple filtration layers.

5. The filter media of claim 1, wherein the non-woven fiber web is formed from fibers selected from the group consisting of natural fibers, organic fibers, inorganic fibers, and combinations thereof.

6. The filter media of claim 1, wherein the filtration substrate is formed from fibers selected from the group consisting of glass fibers, ceramic fibers, polymer fibers, cotton fibers, hemp fibers, carbon fibers, and combinations thereof.

7. The filter media of claim 1, wherein the conductive polymer comprises poly(3,4ethylenedioxythiophene)poly(styrenesulfonate).

8. The filter media of claim 1, wherein the conductive polymer comprises polyaniline.

9. The filter media of claim 1, wherein the conductive polymer comprises carbon particles.

10. The filter media of claim 1, further comprising a bonding agent bonding the conductive coating to the non-woven fiber web.

11. The filter media of claim 10, wherein the bonding agent is formed from a polymer selected from the group consisting of polyvinylidene chloride, acrylic lattices, polyurethane dispersion, polyvinyl acetate, and polyvinyl alcohol.

12. The filter media of claim 10, wherein the bonding agent is conductive.

13. The filter media of claim 1, wherein the filter media is pleated.

14. The filter media of claim 1, wherein the conductive coating coats a predetermined portion of the non-woven fiber web.

15. The filter media of claim 1, further comprising coupling mechanism for connecting a high voltage power source to the conductive coating.

16. The filter media of claim 15, wherein the coupling mechanism comprises an electrode.

17. The filter media of claim 1, wherein the conductive coating is adapted to emit ions when energy is delivered thereto to increase an efficiency of the filter media.

18. The filter media of claim 1, wherein the non-woven fiber web is formed from glass fibers.

19. The filter media of claim 1, wherein the non-woven fiber web includes a first surface and a second surface, and the at least one conductive coating coats only one surface of the non-woven fiber web.

20. The filter media of claim 1, wherein the non-woven fiber web includes a first surface and a second surface, and the at least one conductive coating coats both surfaces of the non-woven fiber web.

21. The filter media of claim 1, wherein the filter media is a hydraulic filter media.

22. The filter media of claim 1, wherein the filter media is a fuel filter media.

23. The filter media of claim 1, wherein the non-woven web is a wet-laid structure.

\* \* \* \* \*

UNITED STATES PATENT AND TRADEMARK OFFICE
CERTIFICATE OF CORRECTION

PATENT NO. : 8,663,358 B2  
APPLICATION NO. : 13/103170  
DATED : March 4, 2014  
INVENTOR(S) : Wai Ming Choi et al.

Page 1 of 1

It is certified that error appears in the above-identified patent and that said Letters Patent is hereby corrected as shown below:

In the Specification

Column 3, line 56, the words "$1\times10^{12}$ ohms$^2$" should be "$1\times10^{12}$ ohms per square"

Column 3, line 61, the words "$1\times10^{7}$ ohms$^2$" should be "$1\times10^{7}$ ohms per square"

Column 5, line 42-43, the words "25.3 ohms$^2$" should be "25.3 ohms per square"

Column 5, line 44, the words "$1\times10^{13}$ ohms$^2$" should be "$1\times10^{13}$ ohms per square"

Column 5, line 55, the words "13.5 ohms$^2$" should be "13.5 ohms per square"

Column 5, line 57, the words "$1\times10^{13}$ ohms$^2$" should be "$1\times10^{13}$ ohms per square"

Column 6, line 1, the words "27.6 ohms$^2$" should be "27.6 ohms per square"

Column 6, line 3, the words "$1\times10^{13}$ ohms$^2$" should be "$1\times10^{13}$ ohms per square"

Column 6, line 18, the words "55,000 ohms$^2$" should be "55,000 ohms per square"

Column 6, line 20, the words "$1\times10^{13}$ ohms$^2$" should be "$1\times10^{13}$ ohms per square"

In the Claims

Column 6, Claim 2, line 39, "ohms$^2$" should be "ohms per square"

Column 6, Claim 3, line 41, the word "ohms$^2$" should be "ohms per square"

Signed and Sealed this  
Fourteenth Day of April, 2015

Michelle K. Lee  
*Director of the United States Patent and Trademark Office*